Dec. 7, 1937.     M. E. WAGLER     2,101,661
AUXILIARY MOLDBOARD ATTACHMENT FOR PLOWS
Filed Feb. 26, 1937     4 Sheets-Sheet 1
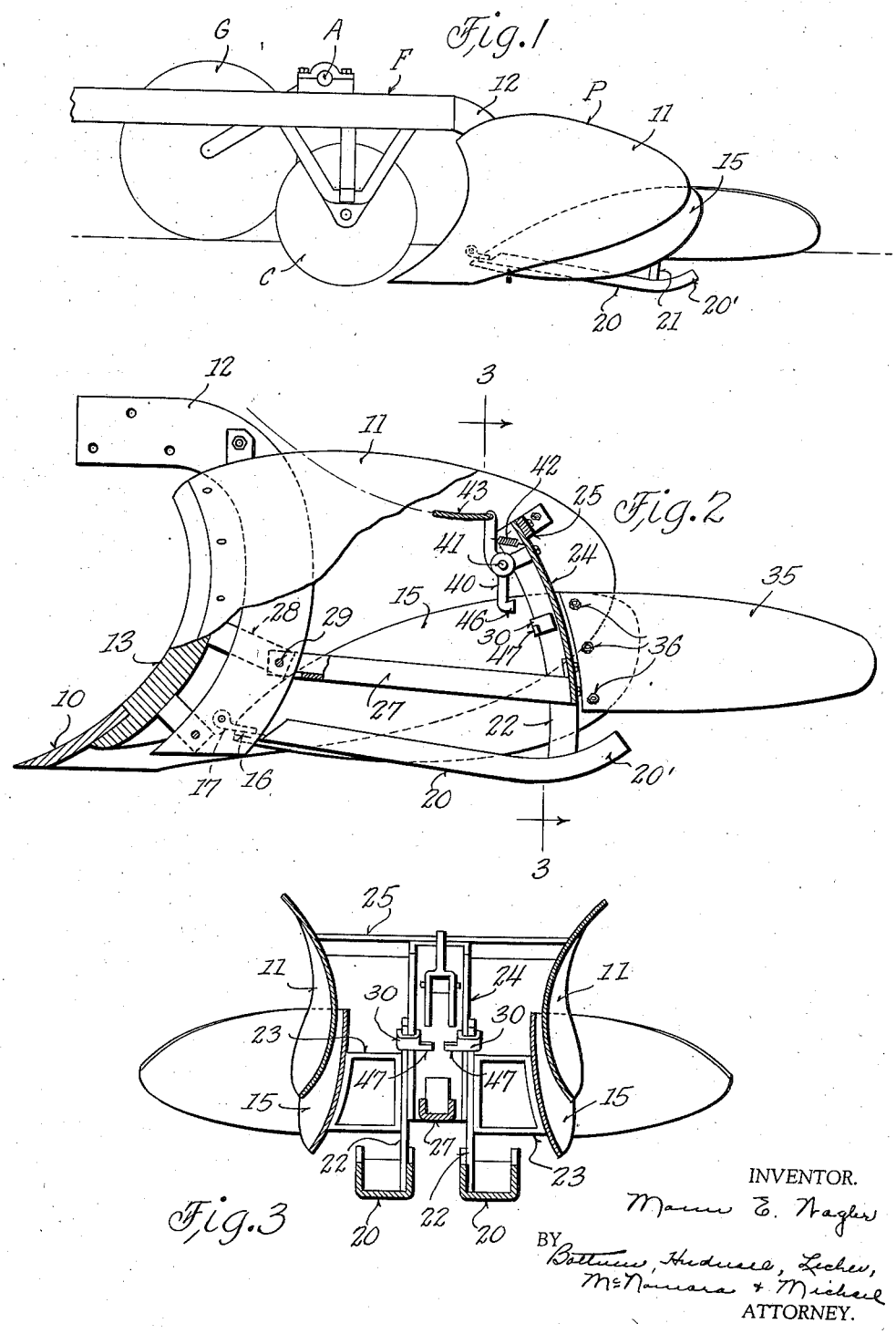
INVENTOR.
Marion E. Wagler
BY
ATTORNEY.

Dec. 7, 1937.      M. E. WAGLER      2,101,661
AUXILIARY MOLDBOARD ATTACHMENT FOR PLOWS
Filed Feb. 26, 1937      4 Sheets-Sheet 2

INVENTOR.
Maurer E. Wagler
BY Bottum, Hudnall, Lecher,
McNamara & Michael
ATTORNEY.

Dec. 7, 1937.    M. E. WAGLER    2,101,661
AUXILIARY MOLDBOARD ATTACHMENT FOR PLOWS
Filed Feb. 26, 1937    4 Sheets-Sheet 3

INVENTOR
MANN E. WAGLER
BY John W. Michael
ATTORNEY

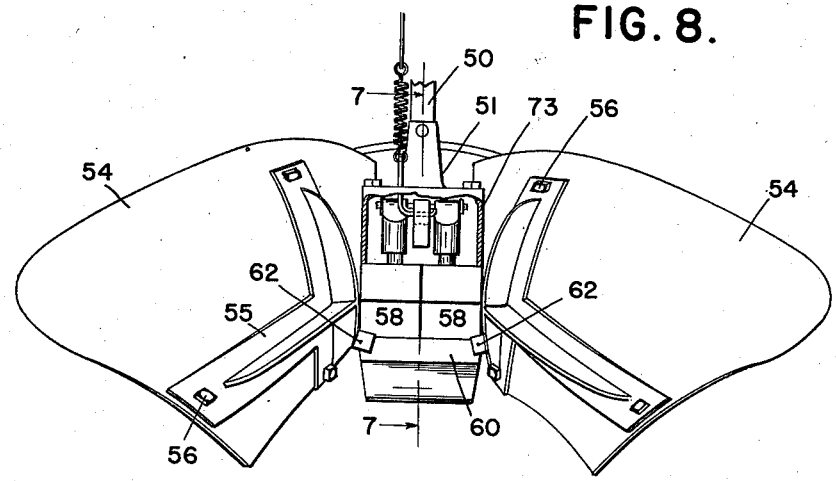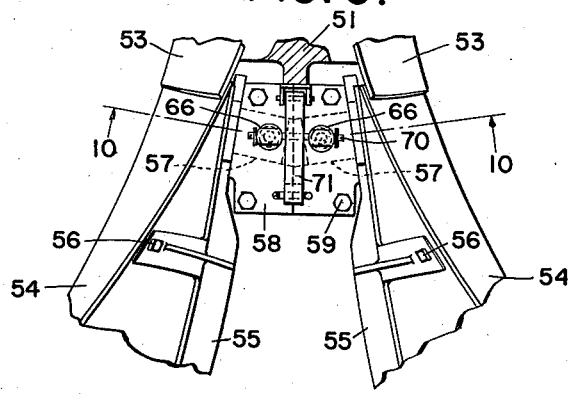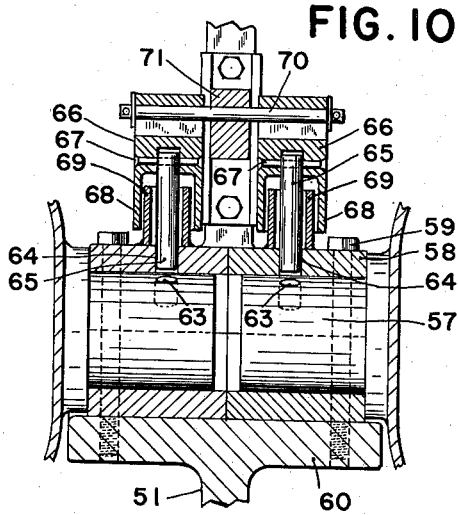

Patented Dec. 7, 1937

2,101,661

UNITED STATES PATENT OFFICE 2,101,661

AUXILIARY MOLDBOARD ATTACHMENT FOR PLOWS

Mann E. Wagler, Milwaukee, Wis., assignor to Hunter Tractor & Machinery Co., Milwaukee, Wis., a corporation of Wisconsin Application February 26, 1937, Serial No. 127,932

16 Claims. (Cl. 97—134)

This invention relates to an improvement in plows and is especially designed and adapted for use in forming forestry planting furrows or in connection with fire lane plowing.

The present application is a continuation in part of my application for Auxiliary mold board attachment for plows, filed November 9, 1935, Serial No. 48946.

In work of the character mentioned, the land to be plowed is usually in rather rough condition. It has not been completely cleared and conditions are such that the plows used frequently must ride up over logs, rocks, or other similar obstructions encountered and which may not be plowed through. When this occurs, as it frequently does under actual working conditions, the earth on the mold boards of the plow drops back into the furrow. Not only this but the land frequently has vines or roots therein which extend along the furrow and which, when snagged by the plow as the latter rides up over an obstruction, pulls considerable earth back into the previously formed furrow.

One of the objects of the present invention is to provide a plow of the character specified with an auxiliary mold board arrangement capable of throwing or turning earth up over the sides of the furrow when the main mold boards are lifted due to the colter plow or either of the ground wheels riding up over an obstruction.

While the invention may be embodied in a variety of forms, it is essential in all constructions, that the auxiliary mold boards be floatably interconnected with the plow in such manner that the auxiliary mold boards may move up and down to some extent at least with respect to the main mold boards and yet the forward portions of the auxiliary mold boards and the rearward portions of the main mold boards remain overlapped in all relative positions of the two. This enables the auxiliary mold boards to throw or turn the earth up over the sides of the furrow when the main mold boards are lifted.

Another object of the invention is to provide a plow of this character and having these advantages and which is simple and durable in construction, reliable and effective in operation, adapted to be readily transported from place to place and susceptible of convenient and economical manufacture from materials and by means of facilities ordinarily available.

Other objects and advantages reside in certain novel features of the construction, arrangement and combination of parts, which will be hereinafter more fully described and particularly pointed out in the appended claims, reference being had to the accompanying drawings, forming a part of this specification, and in which:

Figure 1 is a view in side elevation showing a plow embodying the present invention and illustrating diagrammatically one type of hitch or draft rigging with which the plow may be conveniently employed;

Figure 2 is a view partly in side elevation and partly in lingitudinal vertical section illustrating the construction of the improved plow;

Figure 3 is a view in transverse vertical section taken on line 3—3 of Figure 2;

Figure 8 is a view in rear elevation of the plow construction shown in Figure 6;

Figure 9 is a fragmentary view in top plan of the construction illustrated in Figures 6 to 8; and Figure 10 is a fragmentary view in transverse section taken on line 10—10 of Figure 9.

Figure 4:
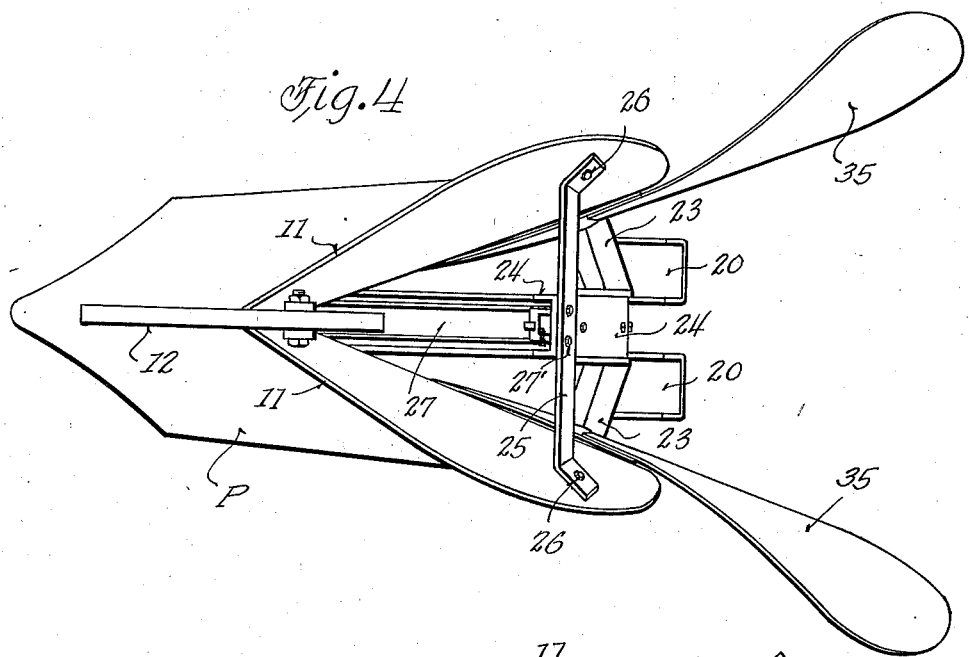
Figure 4 is a view of the plow in top plan.
Figure 5:
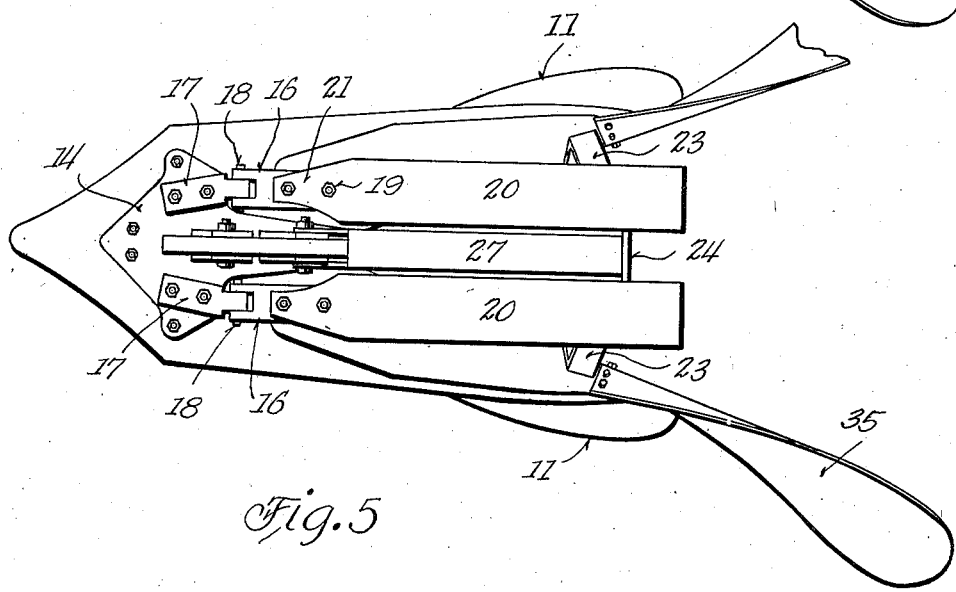
Figure 5 is a view thereof in bottom plan.

Referring to the drawings it will be seen that in the embodiment of the invention shown in Figures 1 to 5, the plow P comprises a point or share 10, a pair of main mold boards 11 and a beam 12 assembled with a frog skin 13 and a frog 14 by means of suitable fastening devices. The construction as thus far described is what has been previously used and it is the usual practice to connect the beam with the frame F of a hitch or draft rigging of the type in which the frame F is supported by means of ground wheels G and a U-shaped axle A. Associated with the draft hitch is a colter plow C. This arrangement, which is well known, is such as to cause the plow P to be elevated to clear any obstruction such as a log or stone over which the colter plow C rides. The difficulty with a plow of this kind has been that when the plow P is elevated the earth which has been excavated and lies against its mold boards 11 will drop back into the furrow.

In general, the present invention, in this embodiment of the invention, proposes an auxiliary mold board 15 for each main mold board 11 and so shapes and fastens the auxiliary mold boards 15 that normally they are nested within the main mold boards 11, as indicated in Figures 1, 2, and 3. The yoked attaching bracket 16 is suitably secured to the forward end of each auxiliary mold board 15 and straddles an attaching bracket 17 secured to the frog of the plow. A pivot pin 18 interconnects the brackets 16 and 17. The type of pivotal connection illustrated between the mold board 15 and and the frog of the plow is well adapted for the purposes of the present invention but it is to be understood that the details thereof may be varied, it being essential however to so interconnect the auxiliary mold board with the plow that it is positively pulled along therewith and yet free to float or move up and down vertically.

A ground shoe 20 is provided for each auxiliary mold board 15. These ground shoes are made up of rather elongated channels, the flat undersides of the bases of which are presented to the bottom of the furrow. At its forward end each shoe 20 has its side flanges cut away and its base tapered as at 21 to adapt it to be secured to its auxiliary mold board. This may be conveniently accomplished by the same fastening devices designated at 19 which are employed to secure the bracket 16 to the auxiliary mold board. The rearward end of each shoe 20 may be upcurved as indicated at 20', in Figures 1 and 2. Adjacent the rearward end of each ground shoe a vertically extending and arcuate standard or upright 22 is provided, the lower end thereof being welded or appropriately fastened to its ground shoe. The standards 22 are not only connected to the ground shoes but they are connected with their respective auxiliary mold boards 15 by means of hollow connecting blocks 23. One such block is disposed between the outer face of each standard and the adjacent portion of the inner face of its auxiliary mold board 15 and these parts are suitably welded together. In this way each auxiliary mold board 15 together with its shoe 20, its standard 22 and its connecting block 23, are all constrained to corresponding up and down movement, inasmuch as these parts are all positively connected together and can only move as a unit about their pivot pin 18. However, each auxiliary mold board 15 and its connected structure is movable independently of the other.

The standards 22 slide against the outer faces of the side flanges of a fixed guide channel 24, which has a longitudinal curvature corresponding to the curvature of the standards 22, namely, an arcuate form having the axis of the pivot pins 18 as its center. The fixed guide channel 24 is rigidly held in position by means of a cross brace 25, the ends of which are suitably secured as at 26 to the main mold boards 11 and the center of which is fastened as at 27' to the fixed guide channel 24. In addition to the cross brace 25 a longitudinal brace 27 is provided and is fastened at its rearward end to the lower end of the fixed guide channel 24 and is suitably connected as at 29 at its forward end to a bracket 28 secured to the frog skin 13.

The standards 22 are constrained to a sliding movement on the outer faces of the flanges of the guide channel 24 by means of generally U-shaped guide clips 30, one for each standard 22. Each clip 30 has one of its legs fastened to its standard 22 and has the other leg embracing the adjacent side flange of the guide channel 24 as clearly shown in Figure 3.

With the construction as thus far described and the plow in use, should the colter plow C ride over an obstruction the plow P will be elevated in the usual manner and this, of course, will carry the main mold boards 11 up out of the furrow. However, the shoes 20 continue to ride on the bottom of the furrow and consequently the auxiliary mold boards 15 remain lowered and are effective to throw out of the furrow the earth which falls down off of the elevated main mold boards 11.

This action of the auxiliary mold boards 15 may be enhanced by the provision of wing extensions 35 which may be releasably secured to the trailing ends of the auxiliary mold boards by bolts and nuts or other releasable fastenings 36.

In order that the auxiliary mold boards 15 and associated parts may be retained elevated, as, for example, when the plow is being transported from place to place, some suitable means is provided for releasably securing the auxiliary mold boards and their associated parts against relative vertical movement with respect to the main mold boards 11. This means may comprise a double pronged hook or latch 40 pivotally mounted as at 41 on the fixed guide channel 24. A spring 42 biases the latch to released position but it may be swung into operative position by means of a suitable control line 43. When the latch is in position to hold the auxiliary mold boards in position, its bills or hooks 46 engage under inward projections 47 integral with the guide clips 30 which, it will be remembered, are fastened to the standards 22 and indirectly to the shoes 20 and auxiliary mold boards 15.

Figure 6:
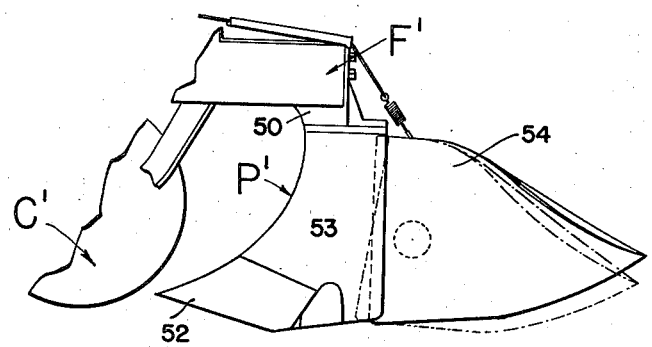
Figure 6 is a fragmentary view in side elevation showing another construction embodying the present invention.
Figure 7:
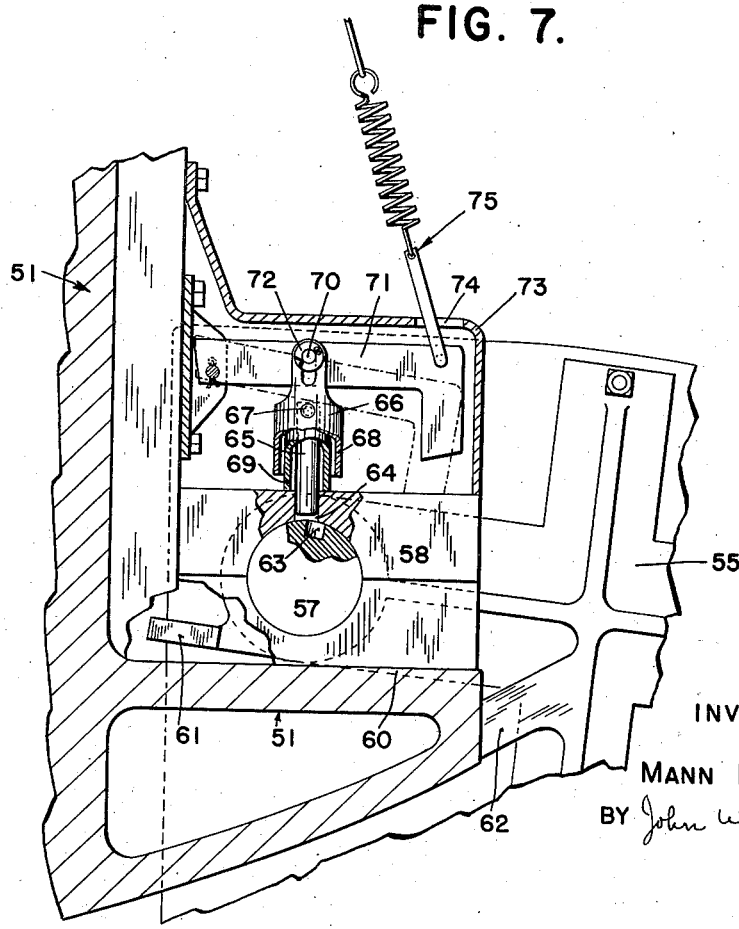
Figure 7 is a fragmentary view in vertical section taken on line 7—7 of Figure 8.

In the form of the invention shown in Figures 6 to 10 inclusive the plow is designated at P'. The beam of the plow is designated at 50 and may be integral with or suitably connected to the frame 51 of the plow. This beam 50 is connected to the frame F' of the hitch or draft rigging which as before is provided with a colter plow C', a fragment of which is shown in Figure 6. A point or share 52 is suitably secured to the plow frame. A pair of main mold boards 53 are also fastened to this frame in cooperative relation to the point of share 52. Combined with the main mold boards 53 is a pair of auxiliary mold boards designated at 54. Each auxiliary mold board 54 is made up of a suitably curved or shaped piece of metal which is strengthened and stiffened by means of a brace 55. Each brace 55 comprises a general T shaped metal structure having an angular cross section and secured by means of bolts or nuts 56 to the inner face of its mold board.

The forward ends of the mold boards 54 overlap the rearward portions of the main mold boards 53 and this overlapping relation is maintained in all relative positions of the main and auxiliary mold boards.

The mold boards 54 are floatably interconnected with the frame of the plow so that they are constrained to move along with the plow and yet are free to move or swing up and down or vertically to enable them to turn or throw earth up over the sides of the furrow even when the main mold boards are lifted due to the colter or with one of the ground wheels lifting over an obstruction.

For this purpose each of the auxiliary moldboards is provided with an inwardly extending trunnion 57 which may be conveniently formed as an integral part of its brace 55. The trunnions 57 are rotatably interfitted with bearing boxes 58 the sections of which are secured by means of bolts 59 to a seat 60 provided therefor on the frame 51 of the plow. When the trunnions 57 are interfitted with their bearing boxes they are precluded from any material axial displacement with respect thereto by the overlapping engagement of the main and auxiliary mold boards.

The extent to which each auxiliary mold board 54 may swing relative to its main mold board 53 in either direction is limited by means of a pair of stops designated at 61 and 62. These stops which are shown to advantage in Figure 7 may be provided as integral parts of the brace 55. When the rearward end of an auxiliary mold board swings upward the extent of such swinging motion will be limited by the engagement of the stop 61 with the top of the seat 60. The downward swinging movement of each auxiliary mold board is similarly limited by the engagement of its stop 62 with the rear face of the seat 60.

When a plow constructed in this manner is in use the lower edges of the auxiliary mold boards ride on the side walls of the furrow and usually the auxiliary mold boards are maintained somewhat elevated, that is, the stops 62 spaced from the rear face of the seat 60. If the main mold boards are lifted up out of the furrow the auxiliary mold boards drop down sufficiently to enable them to function to throw or turn the earth that has been excavated by the plow points and has passed back on the main mold boards up over the sides of the furrow.

In order that the auxiliary mold boards may be latched or releasably secured in elevated position when the plow is being transported, each trunnion 57 is provided with a socket 63. The top sections of the bearing boxes 58 are provided with vertical extending openings 64 and when the mold boards are elevated as far as they may be the sockets 63 of the trunnion 57 are vertically aligned with these openings 64. Latching bolts 65 are freely slidable in the openings 64 and are biased by their own weight or in any other suitable way to latching position so that they tend to drop down through the openings 64 and into the sockets 63 when the sockets 63 are in line with the openings 64. The bolts 65 are provided with heads 66, pinned as at 67 to the bolts. Sleeves 68 are formed integral with the heads and loosely telescoped over sleeve 69 secured to the top sections of the bearing boxes 58 and around the opening 64 thereof. This sleeve protects the bolts and structure from the weather and from dirt. Cross pin 70 connects the heads 66 with a common operating lever 71, the cross pin 70 extending through an opening in the lever and through slots in the heads 66. The cross pin 70 may be held against axial displacement by ordinary washers and cotter pins 72. This arrangement is enclosed in a cover 73 having a slot 74 in its top whereby the lever may be connected with a control line 75 extending to a suitable point of control. When the control line 75 is placed under appropriate tension the bolt 65 is pulled upward and released. When the tension on the line 75 is released the lever 71 drops down to the dotted line position shown in Figure 7 and the bolts 65 are biased to their latching position.

With a plow of the character described, even though the main mold boards ride up over an obstruction the earth will not fall back into the furrow but will be deflected away from the furrow by the auxiliary mold boards and also by their extensions when the extensions are employed. This obviates the necessity of manually cleaning out the furrow.

It should be noted that the present invention functions with equal effectiveness under either of two conditions. Under one condition met with in use, the colter plow rides up over an obstruction and raises the plow and then the auxiliary mold boards function. Under another condition of use one of the ground wheels will ride up over an obstruction and tilt or lift the plow and in such event the auxiliary mold board on the lifted side will function.

While I have shown and described several constructions in which the invention may be advantageously embodied it is to be understood that these constructions have been selected merely for the purpose of illustration or example and that various changes in the size, shape and arrangement of the parts may be made without departing from the spirit of the invention or the scope of the subjoined claims.

The invention claimed is:

1. A plow having a plow point, mold board and beam and further characterized by the provision of an auxiliary mold board disposed within said first named mold board and pivotally interconnected with the plow at its forward end and a shoe for the auxiliary mold board whereby the latter is normally inactive and within the confines of the main mold board but is rendered effective automatically upon elevation of said plow.

2. A plow having a frog, a point, main mold board and beam associated with said frog, an auxiliary mold board normally nested within the main mold board, a pivotal connection between the auxiliary mold board and the frog, a shoe attached to said auxiliary mold board and adapted to ride on the bottom of the furrow made by the plow and means cooperable with the rear end portion of the shoe to constrain it and its auxiliary mold board to vertical movement.

3. In combination with a plow having a main mold board, a normally inactive auxiliary board disposed within the main mold board, and means interconnecting the forward end of the auxiliary mold board with the plow to constrain the auxiliary mold board to move along with the plow and yet leave it free to move up and down, said auxiliary mold board functioning to deflect earth away from the furrow when the plow is lifted or tilted.

4. In combination with a plow having a main mold board, an auxiliary board disposed within the main mold board, means interconnecting the forward end of the auxiliary mold board with the plow to constrain the auxiliary mold board to move along with the plow and yet leave it free to move up and down, and a ground shoe associated with the auxiliary mold board and adapted to ride along the bottom of the furrow.

5. In combination with a plow having a main mold board, an auxiliary mold board disposed within the main mold board, means pivotally connecting the forward end of the auxiliary mold board to the plow, a ground shoe connected with the auxiliary mold board and adapted to ride on the bottom of the furrow, and means carried by the plow and coacting with the ground shoe and auxiliary mold board to constrain the auxiliary mold board to vertical movement.

6. In combination with a plow having a main mold board, an auxiliary mold board disposed within the main mold board, means pivotally connecting the forward end of the auxiliary mold board to the plow, a ground shoe connected to the forward end of the auxiliary mold board, a standard connected to the rearward end of the ground shoe, a connection between the standard and the auxiliary mold board, and means coacting with the standard to constrain the auxiliary mold board to up and down movement.

7. In combination with a plow having a main mold board, an auxiliary mold board within the confines of said main mold board and normally inactive but floatably interconnected with the plow and effective when the plow is elevated to deflect material excavated by the plow from the furrow.

8. A plow comprising a pair of main mold boards, an auxiliary mold board for each main mold board, a ground shoe for each auxiliary mold board, means interconnecting each ground shoe with its auxiliary mold board, and means for constraining each associated ground shoe and mold board to up and down movement.

9. A plow comprising a pair of main mold boards, an auxiliary mold board for each main mold board, a ground shoe for each auxiliary mold board, means interconnecting each ground shoe with its auxiliary mold board, and means for constraining each associated ground shoe and mold board to up and down movement and comprising a guide member carried by the main mold boards and uprights connected to the ground shoes and auxiliary mold boards, and means effecting a guiding interconnection between the fixed guide member, and the uprights.

10. A combination with a plow having a pair of main mold boards, an auxiliary mold board for each of said main mold boards, means for pivotally interconnecting the forward ends of the auxiliary mold boards with the plow and means for releasably securing the rearward ends of the auxiliary mold boards against vertical movement relative to the main mold boards and comprising a double pronged latch mounted on the plow and a projection connected to each of the auxiliary mold boards, said double pronged latch being cooperable with said projections.

11. A plow of the character described comprising a pair of main mold boards, a pair of auxiliary mold boards disposed with at least their forward portions overlapping the rear portions of the main mold boards and means floatably interconnecting the auxiliary mold boards with the plow to constrain them to move along with the plow and yet provide for free up and down movement of the auxiliary mold boards while maintaining the overlapping relation of said portions so that the auxiliary mold boards will throw earth up over the sides of the furrow as the main mold boards are lifted, and means for limiting the up and down movement of the auxiliary mold boards in either direction.

12. A plow of the character described comprising a pair of main mold boards, a pair of auxiliary mold boards disposed with at least their forward portions overlapping the rear portions of the main mold boards and means floatably interconnecting the auxiliary mold boards with the plow to constrain them to move along with the plow and yet provide for free up and down movement of the auxiliary mold boards while maintaining the overlapping relation of said portions so that the auxiliary mold boards will throw earth up over the sides of the furrow as the main mold boards are lifted, and latching means effective to releasably secure the auxiliary mold boards in elevated position.

13. A plow comprising a frame, a pair of main mold boards rigidly connected to the frame, and a pair of auxiliary mold boards disposed with at least their forward portions in overlapping engagement with the rear portions of the main mold board in all relative adjustments of the two, means floatably interconnecting the auxiliary mold boards with the frame to provide for the free vertical swinging movement thereof, and means for limiting the amount of free vertical swinging movement of the auxiliary mold boards.

14. A plow comprising a frame, a pair of main mold boards rigidly connected to the frame, a share connected to the frame and in co-operative relation to the main mold boards, a pair of auxiliary mold boards having their forward portions overlapping the rearward portions of the main mold boards and having their major portions projecting rearward beyond the main mold boards, bearings mounted on the frame, trunnions secured to the auxiliary mold boards and rotating in said bearings and means limiting the swinging movement of the auxiliary mold boards in either direction.

15. A plow comprising a frame, a pair of main mold boards rigidly connected to the frame, a share connected to the frame and in co-operative relation to the main mold boards, a pair of auxiliary mold boards having their forward portions overlapping the rearward portions of the main mold boards and having their major portions projecting rearward beyond the main mold boards, bearings mounted on the frame, trunnions secured to the auxiliary mold boards and rotating in said bearings, said trunnions having sockets, said bearings having openings, said sockets being aligned with the openings in the elevated positions of the auxiliary mold boards and latching bolts slidable through said openings and engageable with said sockets for releasably securing the mold boards elevated, and means limiting the swinging movement of the auxiliary mold boards in either direction and comprising a pair of stops rigidly secured to each of said auxiliary mold boards and alternatingly engageable with said frame.

16. A plow comprising a frame, a pair of main mold boards rigidly connected to the frame, a share connected to the frame and in cooperative relation to the main mold boards, a pair of auxiliary mold boards having their forward portions overlapping the rearward portions of the main mold boards, bearings mounted on the frame and trunnions secured to the auxiliary mold boards and rotatively interfitting with said bearings.

MANN E. WAGLER.